(12) United States Patent
Panella et al.

(10) Patent No.: US 11,513,990 B1
(45) Date of Patent: *Nov. 29, 2022

(54) RECONFIGURABLE SERVER AND SERVER RACK WITH SAME

(71) Applicant: Molex, LLC, Lisle, IL (US)

(72) Inventors: Augusto Panella, Naperville, IL (US); Allan Cantle, Westlake Village, CA (US); Ray Matyka, Plainfield, IL (US); John W. Comish, Jr., Acton, CA (US)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/392,291

(22) Filed: Aug. 3, 2021

Related U.S. Application Data

(63) Continuation of application No. 16/610,922, filed as application No. PCT/US2018/032652 on May 15, 2018, now Pat. No. 11,100,026.

(60) Provisional application No. 62/506,374, filed on May 15, 2017.

(51) Int. Cl.
*G06F 13/40* (2006.01)
*G06F 13/42* (2006.01)
*G06F 13/38* (2006.01)

(52) U.S. Cl.
CPC ........ *G06F 13/4243* (2013.01); *G06F 13/385* (2013.01); *G06F 13/4068* (2013.01); *G06F 13/423* (2013.01); *G06F 2213/0026* (2013.01)

(58) Field of Classification Search
CPC ............. G06F 13/4027; G06F 13/1668; G06F 13/4282; G06F 13/4243; G06F 13/385; G06F 13/4068; G06F 13/423; G06F 2213/0026
See application file for complete search history.

(56) References Cited

U.S. PATENT DOCUMENTS

| | | |
|---|---|---|
| 6,209,067 B1 | 3/2001 | Collins |
| 2008/0028186 A1 | 1/2008 | Casselman |
| 2009/0022497 A1 | 1/2009 | Mateosky et al. |
| 2011/0031289 A1 | 2/2011 | Haskell et al. |

(Continued)

FOREIGN PATENT DOCUMENTS

| | | |
|---|---|---|
| TW | 201107910 A | 3/2011 |
| TW | 201638712 A | 11/2016 |

(Continued)

OTHER PUBLICATIONS

International Preliminary Report on Patentability received for PCT Application No. PCT/US2018/032652,dated Nov. 28, 2019, 09 Pages.

(Continued)

*Primary Examiner* — Ernest Unelus

(57) ABSTRACT

A reconfigurable server includes improved bandwidth connection to adjacent servers and allows for improved access to near-memory storage and for an improved ability to provision resources for an adjacent server. The server includes processor array and a near-memory accelerator module that includes near-memory and the near-memory accelerator module helps provide sufficient bandwidth between the processor array and near-memory. A hardware plane module can be used to provide additional bandwidth and interconnectivity between adjacent servers and/or adjacent switches.

19 Claims, 15 Drawing Sheets

(56) References Cited

U.S. PATENT DOCUMENTS

| 2015/0373115 | A1 | 12/2015 | Breakstone |
| 2016/0147983 | A1 | 5/2016 | Bakke et al. |
| 2016/0335216 | A1 | 11/2016 | Krishnan |
| 2017/0364459 | A1 | 12/2017 | Bandic et al. |
| 2018/0011812 | A1* | 1/2018 | Morishita ............... G06F 3/067 |

FOREIGN PATENT DOCUMENTS

| TW | 201712559 | A | 4/2017 |
| WO | 2018213232 | A1 | 11/2018 |

OTHER PUBLICATIONS

International Search Report and Written Opinion received for PCT Application No. PCT/US2018/032652, dated Aug. 30, 2018, 10 Pages.

Morgan, "IBM Opens Up Coherent Protocols For Power Chips", The Four Hundred, Power Systems and IBM insight, vol. 26, No. 46, pp. 1-5, Oct. 24, 2016.

Non Final Rejection received for U.S. Appl. No. 16/610,922, dated Oct. 27, 2020, 16 Pages.

Office Action received for JP Application No. 2020-510508, dated Nov. 10, 2020, 09 Pages (05 pages of English translation and 04 pages of official copy).

Sadasivam, et al., "IBM POWER9 Processor Architecture", IEEE computer Society, vol. 37, Issue 2, pp. 40-51, 2017.

Office Action received for Japanese application No. 2021-130477, dated Sep. 6, 2022, 5 pages (2 pages of English Translation and 3 pages of official notification).

* cited by examiner

US 11,513,990 B1

RECONFIGURABLE SERVER AND SERVER RACK WITH SAME

RELATED APPLICATIONS

This application is a continuation of application Ser. No. 16/610,922, filed Nov. 5, 2019, now U.S. Pat. No. TBD, which claims priority to PCT Application No. PCT/US18/32652, filed on May 15, 2018, all of which are incorporated herein by reference in their entirety and which further claims priority to U.S. Provisional Application No. 62/506,374, filed May 15, 2017.

TECHNICAL FIELD

This disclosure relates to the field of data centers, more specifically to features that can be used in a server to improve performance.

DESCRIPTION OF RELATED ART

Server racks are common place in data centers. In order for the data center to function effectively, some type of consistent architecture is desirable. One typical configuration is known as the leaf-spine topology. In such a configuration a switch communicates to all the servers in the same rack with passive cables and the rack is considered a leaf. The switch communicates with a data center "spine" via optical cables (because the distances and signaling frequencies are too great to effectively use copper medium to transmit the signals) and the spine allows communication between various racks/TOR switches. The spine also communicates to the core, which allows communication outside the data center. An embodiment of such a construction is depicted in FIG. 1.

FIGS. 2-2D illustrate feature of a server with a known configuration that is part of the OPENCAPI standard and the depicted server can be positioned in the rack and connected to the switch. More specifically, the server includes a link 7 with 16 channels of PCIe communication connected to a network interface card (NIC) application-specific integrated circuit (ASIC) (collectively B) and this can provide a connection between the server and the switch (as depicted in FIG. 1). As is typical of server designs, the motherboard (MB) (which is labeled A) has main memory that is fast and quick to access for the processor and near-memory that is slower to access. While much of the work can be done in the main memory, certain tasks require access the near-memory. To access the near-memory the MB has a serial advance technology attachment (SATA) controller that connects the processors (which are depicted as POWER 9) and the SATA controller connects the processor(s) to a near-memory card (which can comprise an array of solid state drives (SSD)) (shown as D) via an expander board (shown as C). Because of the SATA connection the bandwidth is relatively limited to each SSD and therefore the server does not provide the performance possible for tasks where more bandwidth to the near-memory would be beneficial. As a result, certain individuals would appreciate further improvements to how servers are configured.

SUMMARY

A server in a rack system can be configured to include improved connectivity between the CPU and the near-memory module, as well as more direct connections between the near-memory module and a switch in the rack system. A programmable logic device (PLD) can be provided that allows for increased bandwidth and essentially make it possible to substantially remove bottlenecks that would otherwise make the server operate less efficiently. The PLD can be provided by a field programmable gate array (FPGA).

In an embodiment a processor module includes a processor array that is connected directly to a plurality of near-memory accelerator modules. The near-memory accelerator modules each includes a PLD and a PCIe switch that helps ensure much higher bandwidth between a processor array on the processor module and a near-memory module provided on the near-memory accelerator module.

The processor module includes a number of PCIe channels and in an embodiment, a PCIe expander module can be provided to provide an alternative path between the PLD and the processor array. A plurality of PCIe channels can be connected to the PCIe expander module and a PCIe switch can connect a portion of the plurality of PCIe channels to each of the PLDs in the near-memory accelerator modules.

In another embodiment, a processor module with a processor array is connected to a hardware plane module that has a first PLD. The hardware plane module includes a plurality of connectors that are connected to the first PLD and these connectors are configured to be connected to external devices. The first PLD is also connects to a second PLD in a near-memory accelerator module. The near-memory accelerator module includes a near-memory module that includes an array of solid state drives (SSDs) and because the first PLD and second PLD are directly connected, provides high bandwidth between the processor array and the near-memory module.

The processor module includes a number of PCIe channels and in an embodiment, a PCIe expander module can be provided to provide an alternative path between the second PLD and the processor array. A plurality of PCIe channels can be connected to the PCIe expander module and a PCIe switch in the PCIe expander module can connect a portion of the plurality of PCIe channels to each of the second PLDs in the near-memory accelerator modules.

BRIEF DESCRIPTION OF THE DRAWINGS

The present application is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity.

Figure 2:
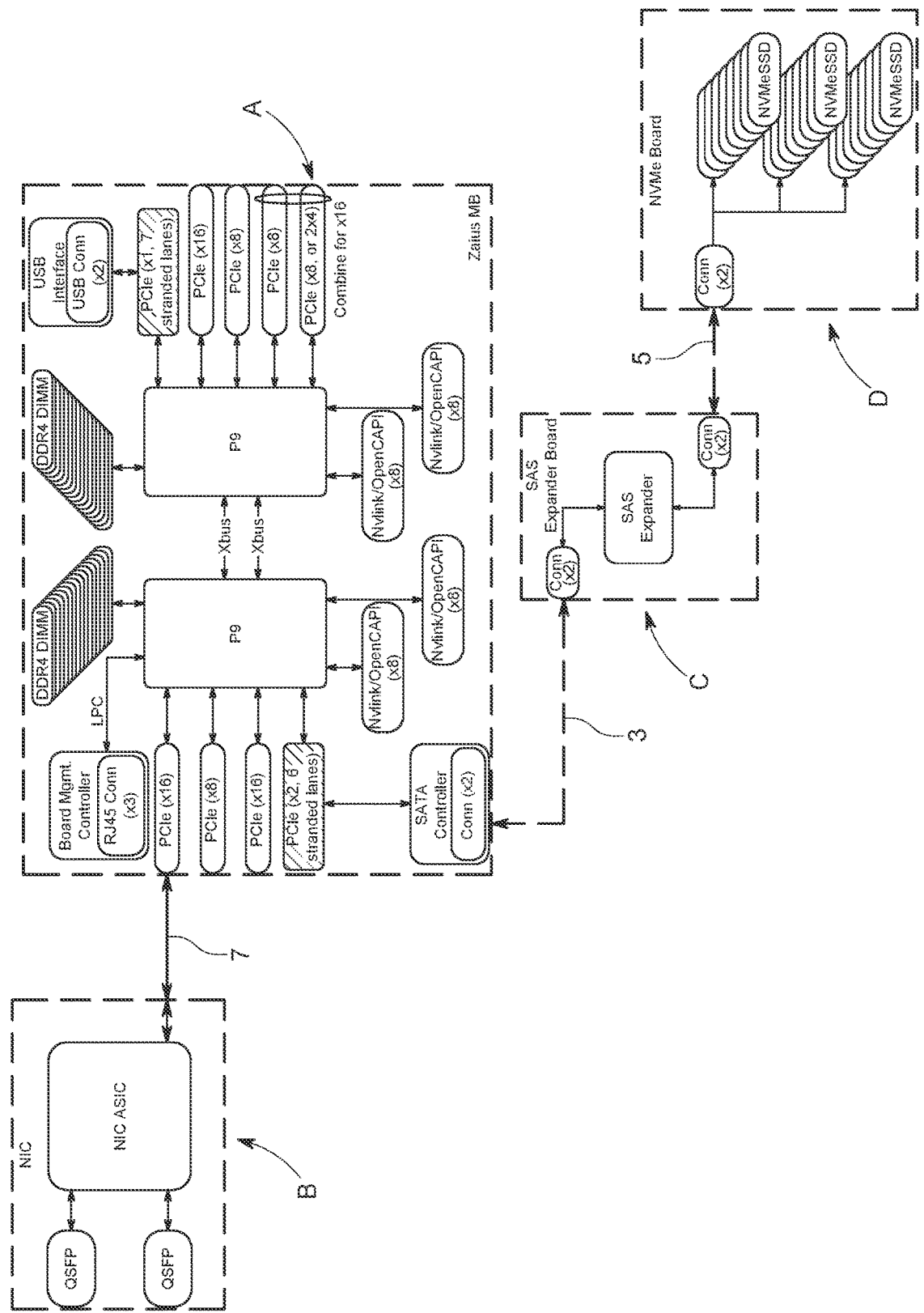
FIG. 2 is a schematic representation of a known server configuration.
Figure 2A:
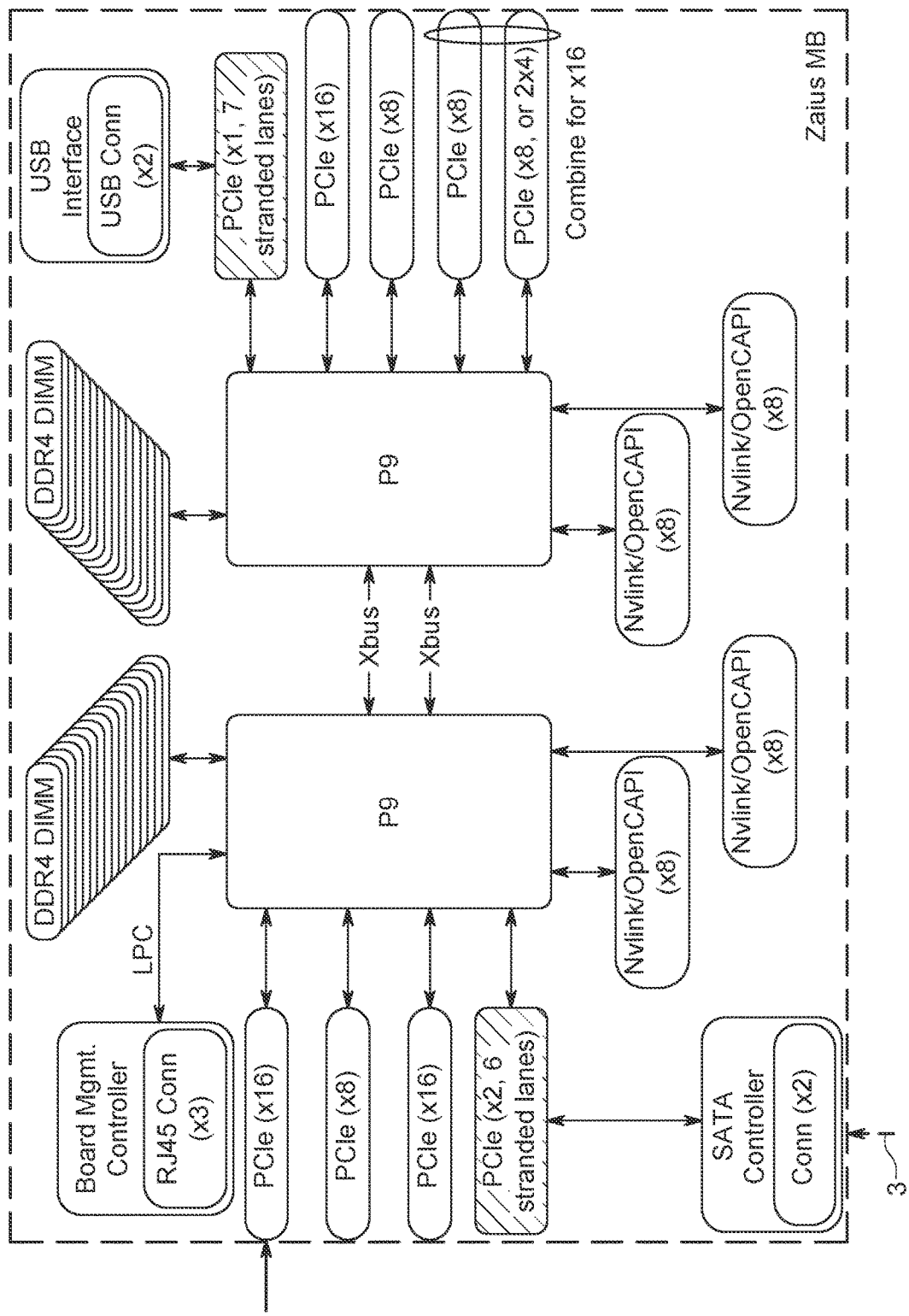
FIG. 2A is a schematic representation of a processor module of the server configuration depicted in FIG. 2.
Figure 2B:
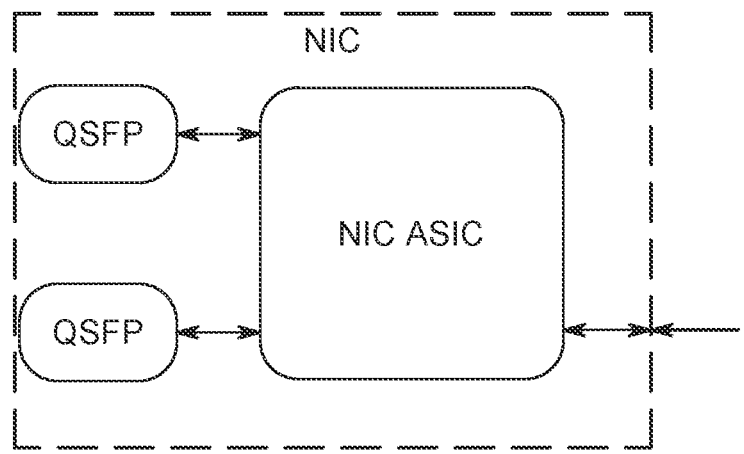
FIG. 2B is a schematic representation of a network interface card (NIC) of the server configuration depicted in FIG. 2.
Figure 2C:
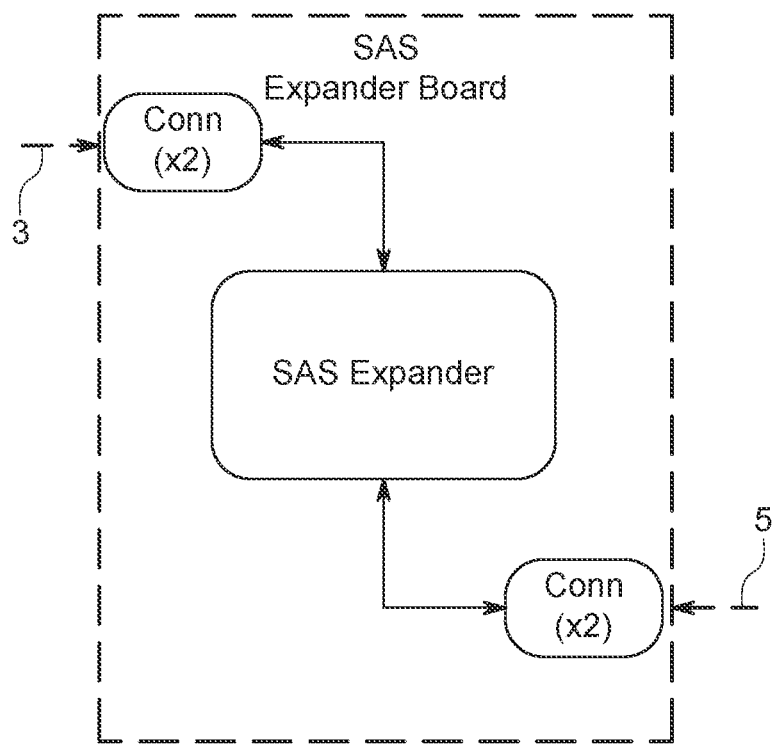
FIG. 2C is a schematic representation of an expander board of the server configuration depicted in FIG. 2.
Figure 2D:
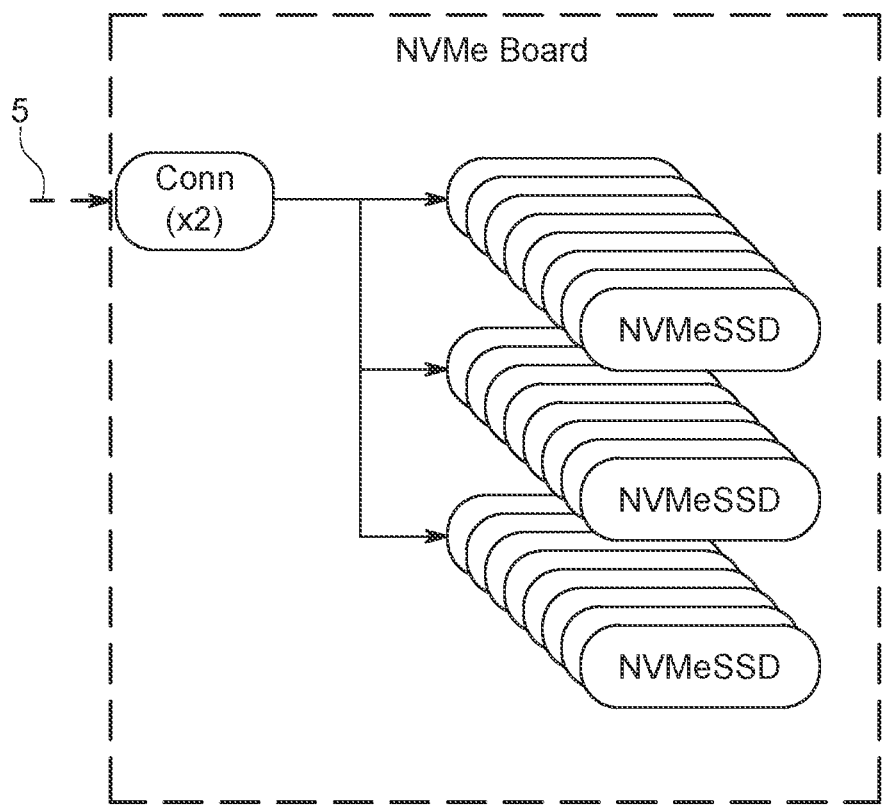
FIG. 2D is a schematic representation of a near-memory module of the server configuration depicted in FIG. 2.

As can be appreciated from the Figs., one of the benefits of the disclosed system is a reduction in components and translations between protocols compared to the prior art. The design illustrated in FIG. 2, for example, has PCIe channels that are converted to a SAS/SATA protocol and then uses an expander board to connect to the array of solid state drives (SSDs). In comparison, the depicted system has an efficient and direct OpenCAPI channel between a processor and a PLD and then uses Peripheral Component Interconnect Express (PCIe) channels between the PLD and the near-memory module. PCIe channels are well known high performance channels with minimal latency. OpenCAPI channels are defined by the OpenCAPI standard and allow for high-speed pathways for transmitting data. This reduces the number of series connections. Specifically, unlike the design depicted in FIG. 2-2D that has a connection between the motherboard and the expander card and the expander card and the near storage, the depicted designs allow for either a direct connection between the near storage card and the processor array or a direction connection between the processor array and a hardware plane module that can integrate information from different sources. In general the depicted designs reduce the insertion loss and should allow for lower power transmitters, saving costs and power usage.

Figure 3:
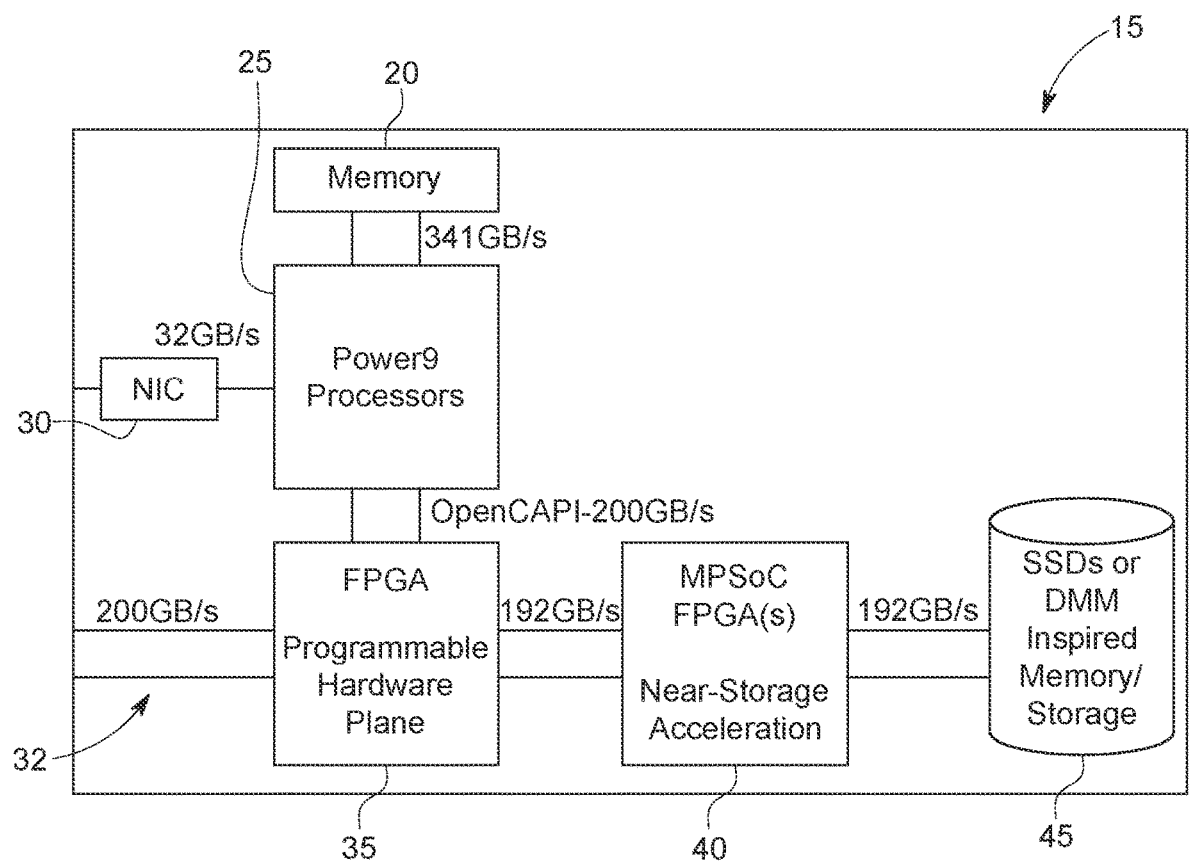
FIG. 3 is a schematic representation of an improved server architecture with a hardware plane.

FIG. 3 illustrate a schematic representation of a server 15 with an alternative configuration that provides increased performance and accessibility to storage compared to known servers. It should be noted that the data rates depicted in FIG. 3 are referring to the sum of the bandwidth to transmit and the bandwidth to receive. For purposes of consistency, the use of the term bandwidth herein will refer to the bandwidth in a single direction (e.g., the transmit bandwidth) with the understanding that the same bandwidth will extend in the opposite direction.

As can be appreciated from FIG. 3, main memory 20 is connected to a processor array 25 that can include a processor array. It should be noted that while POWER9 processers are listed, any suitable processor could work. The processor array 25 is connected to a network interface card (NIC) so as to allow the server 15 to communicate with the switch (and thus is compatible with the existing configuration depicted in FIG. 1. A programmable hardware plane 35 (which includes a field programmable gate array (FPGA) connects the processor array 25 to a storage accelerator 40, which as depicted also includes a FPGA. The storage accelerator 40 is in turn connected to a near-memory module 45 that includes memory suitable for longer term storage. It should be noted that the near-memory module 45 is depicted as being populated with solid state drives (SSD) or dense memory modules (DMM) in an exemplary manner. DMM is a hybrid memory module that includes an FPGA that accesses in parallel LPDDR3 memory (a type of DRAM) and various versions of DMM are available with one of the benefits of DMM being the ability to "transceiverize" the DRAM into a transceiver attached interface. A transceiver attached can help reduce the limitations of conventional parallel DRAM. As the primary issue is performance, any other suitable type of memory that provides the desirable performance could also be used, including RRAM or other new forms of memory. Thus the type of and physical construction of the memory is not intended to be limiting and any type of memory as well as combinations of memory types, may be placed within the near-memory module 45. It is useful for the near-memory module 45 have sufficient bandwidth to allow the 96 GB/s of bandwidth to be fully utilized to help keep the processor array 25 saturated but such a configured near-memory module 45 is not required.

As can be appreciated, one significant benefit of this design is that it allows for much higher bandwidth between the processor array 25 and the near-memory module 45 as well as bandwidth between the near-memory module 45 and an external device (which could be serviced by link 32). Specifically, the bandwidth between the processor array 25 and the hardware plane module 35 can be 100 gigabytes/second (GB/s), the bandwidth between the hardware plane module 35 and external sources (via link 32) can be 100 GB/s and the bandwidth between the hardware plane module 35 and the near-memory module 45 can be 96 GB/s. It should also be noted that the programmable hardware plane 35 is optional and instead the processor array 25 can be directly connected to the storage acceleration module 40. One benefit of using the programmable hardware plane 35, however, is the ability to support high bandwidth between the programmable hardware plane 35 and at least one of the near-memory module 45 (via the storage acceleration module), the processor module 25 and an external source (which is connected via the link 32).

As can be appreciated, various links are provided between modules to allow for information to be shared therebetween. Traditionally these links would be part of a circuit board. To improve performance, the various links between modules can be provided by a cablelized connection that allows for minimal loss (e.g., relatively low levels of insertion loss compared to what is found when using a circuit board) and desirable signal integrity over larger distances. For ease of manufacture and assembly (as well as increased flexibility and improved upgradeability), it is often useful for each module to be mounted on a separate substrate, such as a circuit board, but such a construction is not required.

It should be noted that communication between the various blocks (both internal and external to a module), unless otherwise noted, are intended to be bi-directional. Thus a PCIe 4x connection would have 4 sub channels transmitted and 4 sub channels receiving. As a result, the physical structure used to provide such a connection would have 8 differential pairs with 4 differential pairs providing the transmitting and 4 differential pairs providing the receiving. As a result, a connector would have at least 8 pairs of differential signal pins. Additional signal pins for ground return and timing and such would be expected to be added as desired. It should also be noted that the number of PCIe lanes depicted in each of the Figs. is intended to provide the desired bandwidth based on expected PCIe performance per PCIe channel. The number of PCIe channels needed to provide the performance illustrated in FIG. 3 would depend on whether the PCIe channels were operating at 16 Gbps (for Gen 4) or 8 Gbps (for Gen 3). If the performance of each PCIe channel changes then the number of PCIe channels may be varied accordingly to still provide the desired bandwidth (with the understanding that either faster or additional SSDs may be required to utilize the full bandwidth).

Figure 4:
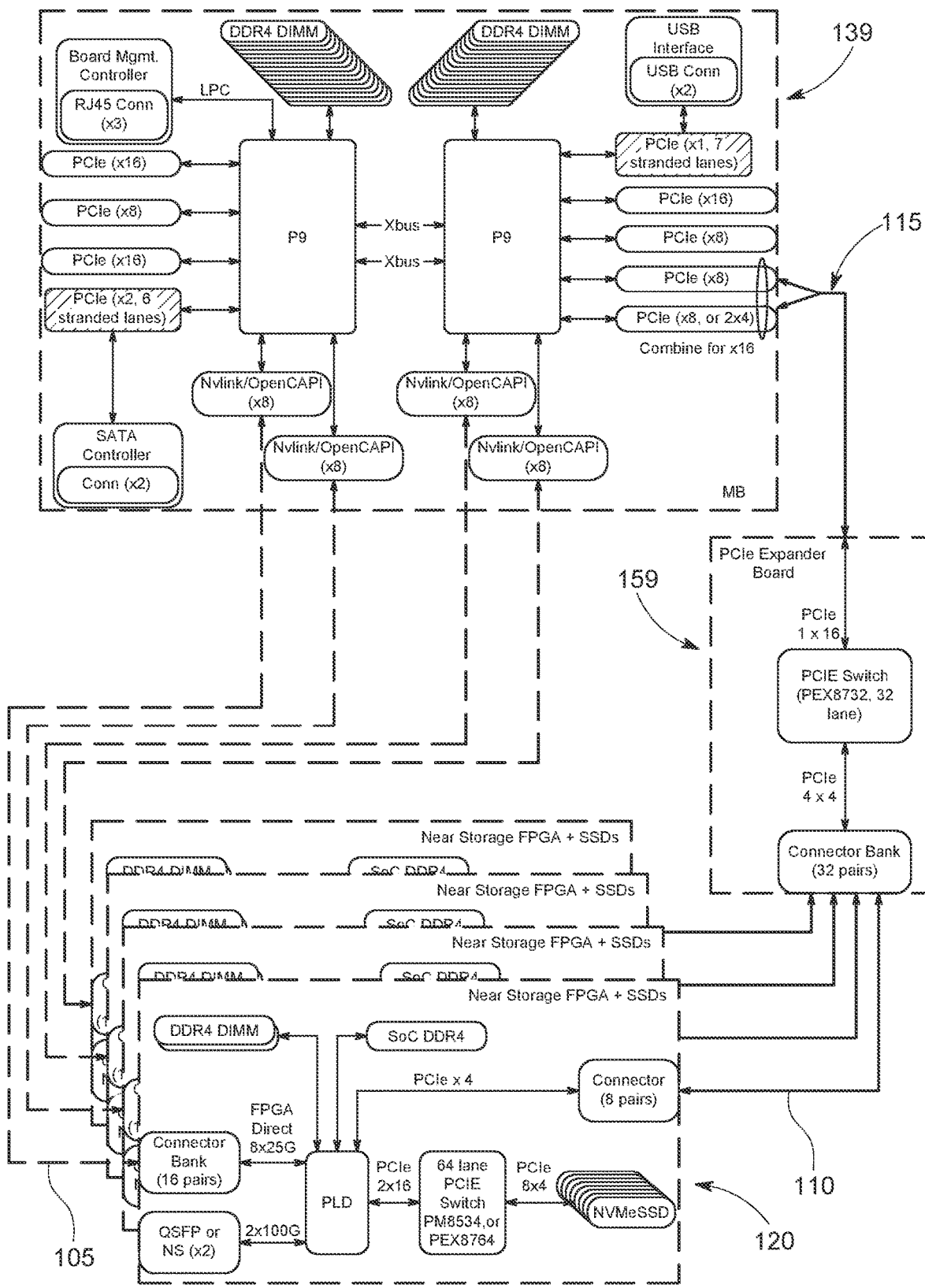
FIG. 4 is a schematic representation of an improved server configuration.
Figure 4A:
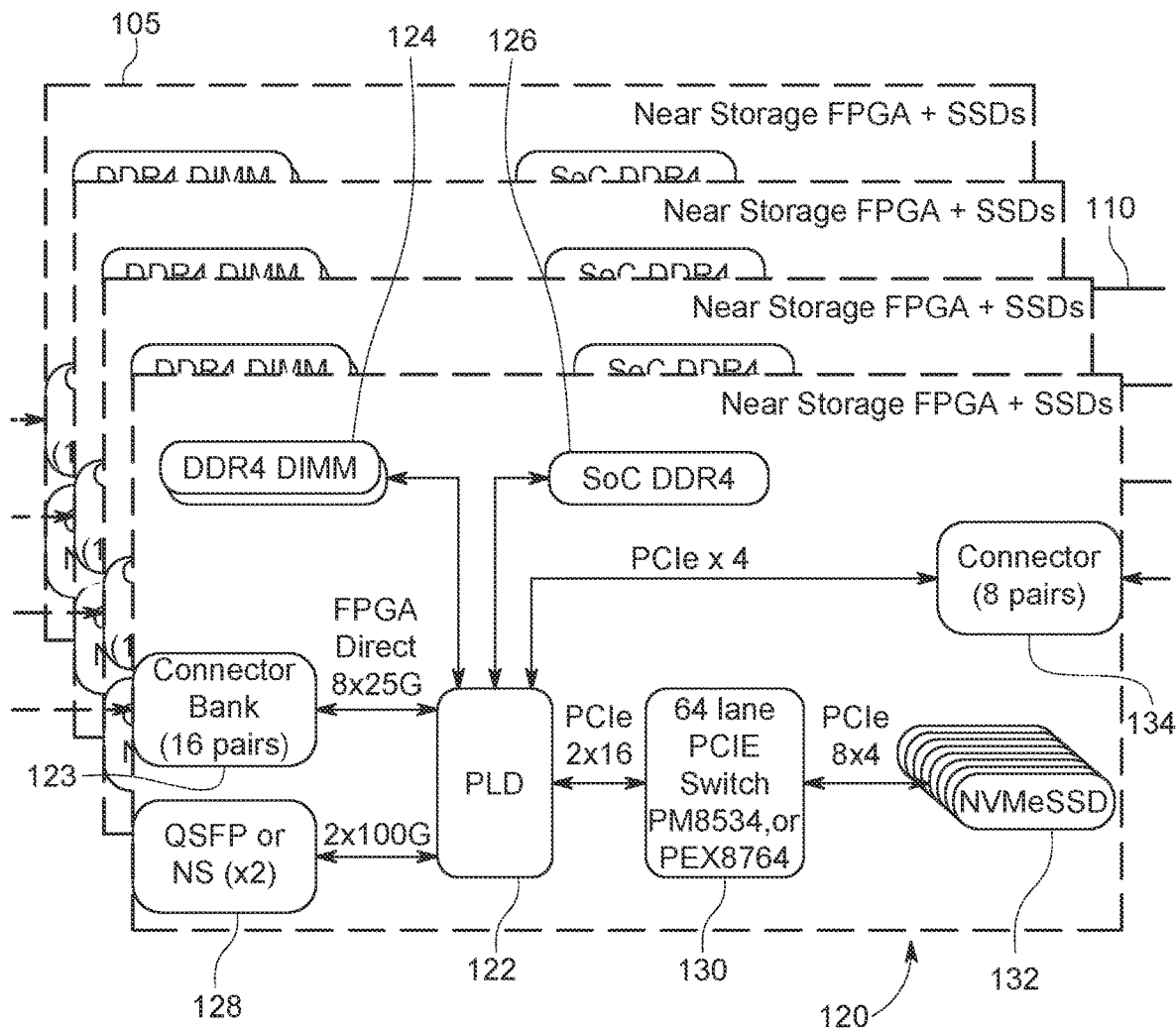
FIG. 4A is a schematic representation of a near-memory accelerator module of the improved server configuration of FIG. 4.
Figure 4B:
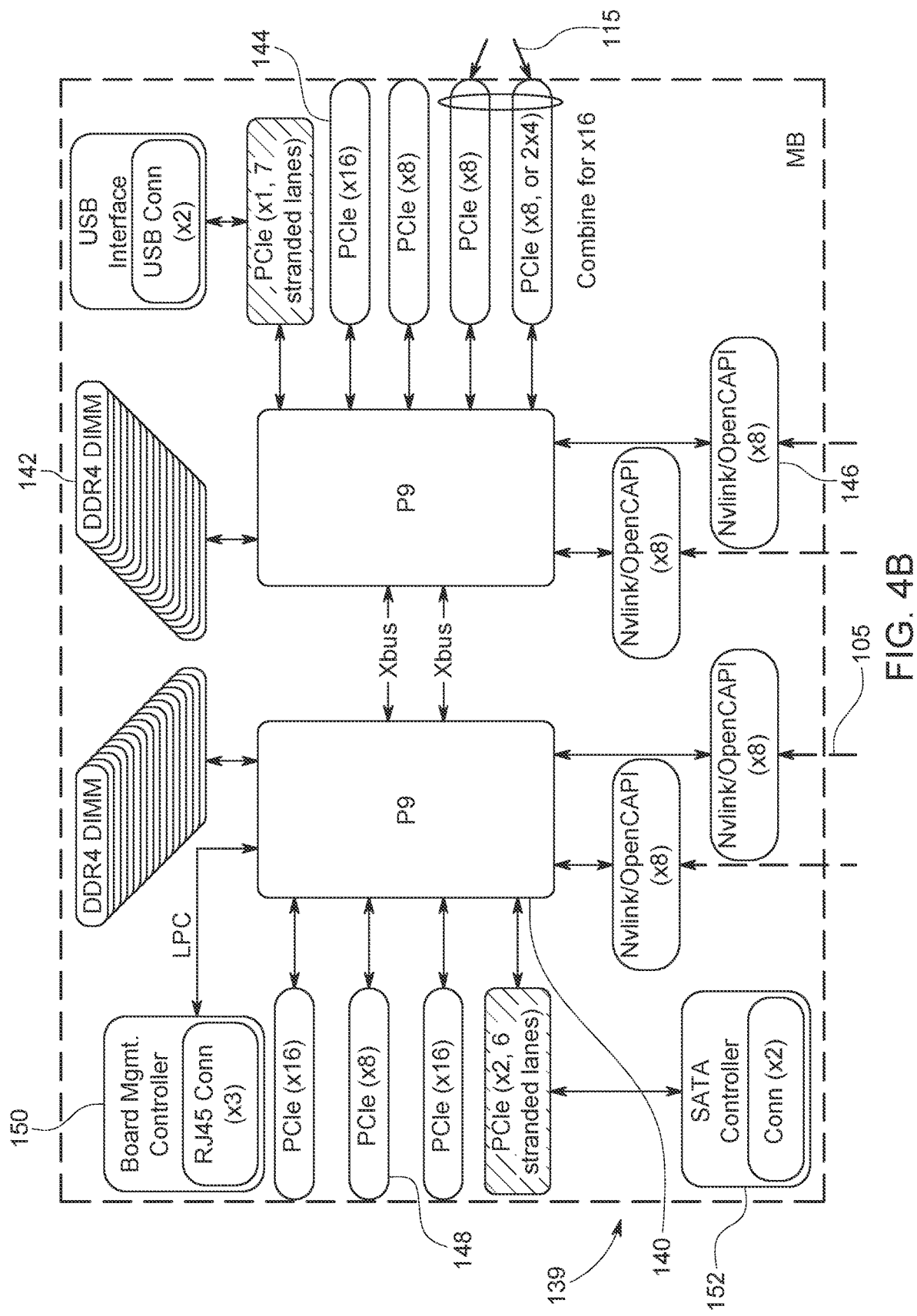
FIG. 4B is a schematic representation of a processor module of the improved server configuration of FIG. 4.
Figure 4C:
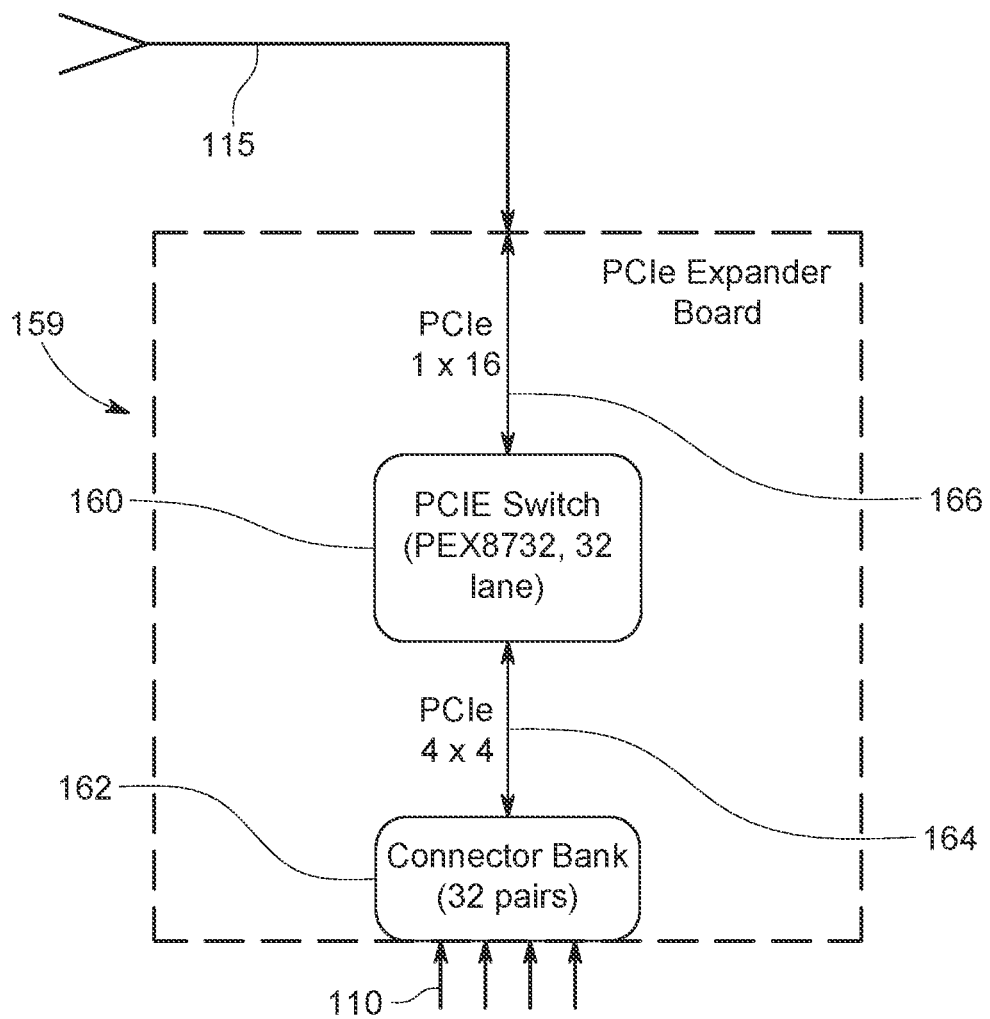
FIG. 4C is a schematic representation of a PCIe expander module of the improved server configuration of FIG. 4.

FIGS. 4-4C illustrate an embodiment of a server with complimentary module cards. A processor module 139 as shown in FIG. 4B (which includes a motherboard MB that supports a processor array 140 which can be one or more processors). As can be appreciated, Power 9 processors are shown and are suitable for many applications but some other processors could also be used, depending on the intended application and the capability of the processor. The processor array 140 is connected to channels 146 (as depicted, each set of channels including 8 lanes that can each support 25 Gbps of transmit) and each set of channels 146 is connected via a link 105 to a near-memory accelerator modules 120 (depicted in FIG. 4A) so that each of the near-memory accelerator modules 120 has a 200 Gbps bandwidth connection with the processor array 140 and the total bandwidth between the processor array 140 and the near-memory accelerator modules 120 is 100 GB/s. Naturally, this could be doubled by doubling the data rate of each lane (for example, by switching from 25 Gbps to 50 Gbps lanes). Further performance improvements could be obtained by doubling the data rate again but naturally the performance per lane is constrained by the capability of the processor array and the performance of the near-memory module and thus further increases in bandwidth may not provide additional performance.

The processor array 140 is connected to main memory 142 (which is typically in the form of conventional RAM) and is also connected to PCIe links 148 and aboard controller 150 that can include one or more RJ45 connectors. A SATA controller 152 can also be connected to the processor array 140. For additional functionality, the processor module 139 can also include PCIe channels 144 and some of these channels 144 can be connected via link 115 to a PCIe expander module 159.

As can be appreciated, the depicted PCIe expander module 159 includes a PCIe switch 160 that is connected to a 1x16 channel 166 between the PCIe switch and the processor module 139 and a four 4 PCIe channel connections 164 that are connected to a connector 162 that is in turn connected by link 110 to the near-memory accelerator module 120.

In order to provide a high bandwidth connection to near-memory (which is expected to be somewhat slower and have higher latency than the main memory 142 but with relatively higher amounts of storage space), the depicted near-memory accelerator modules 120 includes a programmable logic device (PLD) 122 that is connected to the link 105 via a connector bank 123. The PLD 122 can be an FPGA and can include one or more DIMM memory modules 124 and a system on chip (SoC) DDR4 to provide memory for the PLD 122 to function and to record the desired functionality of the PLD 122. The PLD 122 is connected via a plurality of PCIe channels (in an embodiment, 32 PCIe channels) to a switch 130 that is in turn connected to plurality of solid state drives (SSDs) 132 (which can be in a desired RAID configuration) via a plurality of PCIe channels. In an embodiment, 8 SSD drives are connected via 8 sets of 4 PCIe channels but some other number of drives and channels can be used to provide the desired bandwidth, depending on the performance of each SSD. Beneficially, the bandwidth between the switch 130 and each SSD (which can be in the form of an non-volatile memory express or NVMe drive or any other suitable drive) is such that the PLD 122 can substantially use all the bandwidth between each PLD 122 and the processor array 140. As can be appreciated, the PLD 122 can have sufficient bandwidth to also allow the 200 Gbps connection between the PLD 122 and the connector 128 to also be saturated. In an embodiment where there are four near-memory accelerator modules 120 connected to the processor array 140, the four 200 Gbps connections provide a total of 100 GB/s bandwidth between the processor array 140 and the near-memory accelerator modules 120.

The PLD 122 is also connected via connector 134 to link 110, which is connected to the connector 162 in the PCIe expander module 159. The use of the link 115 and the link 110 to provide communication between the processor module 139 and the near-memory accelerator modules 120 allows for additional bandwidth and further ensures the processor array 140 does not have to wait a significant time in order to have access to information stored in the near-memory accelerator modules 120.

To further improve connectivity to the information stored in the near-memory accelerator modules 120, the near-memory accelerator modules 120 can also include a high data rate capable connection 128 to a location that can be outside of the server. This allows for a direct connection from the stored in the near-memory accelerator modules 120 to the switch or server that provides a connection and ready access to the information stored therein, as desired. It should be noted that the connectors illustrated in the various block diagrams can be a variety of different connector configurations (including one or more separate connectors) so long as they provide the necessary functionality and performance. As depicted, the performance is 200 Gbps of collective bandwidth but some other amount of bandwidth could be provided.

Figure 5:
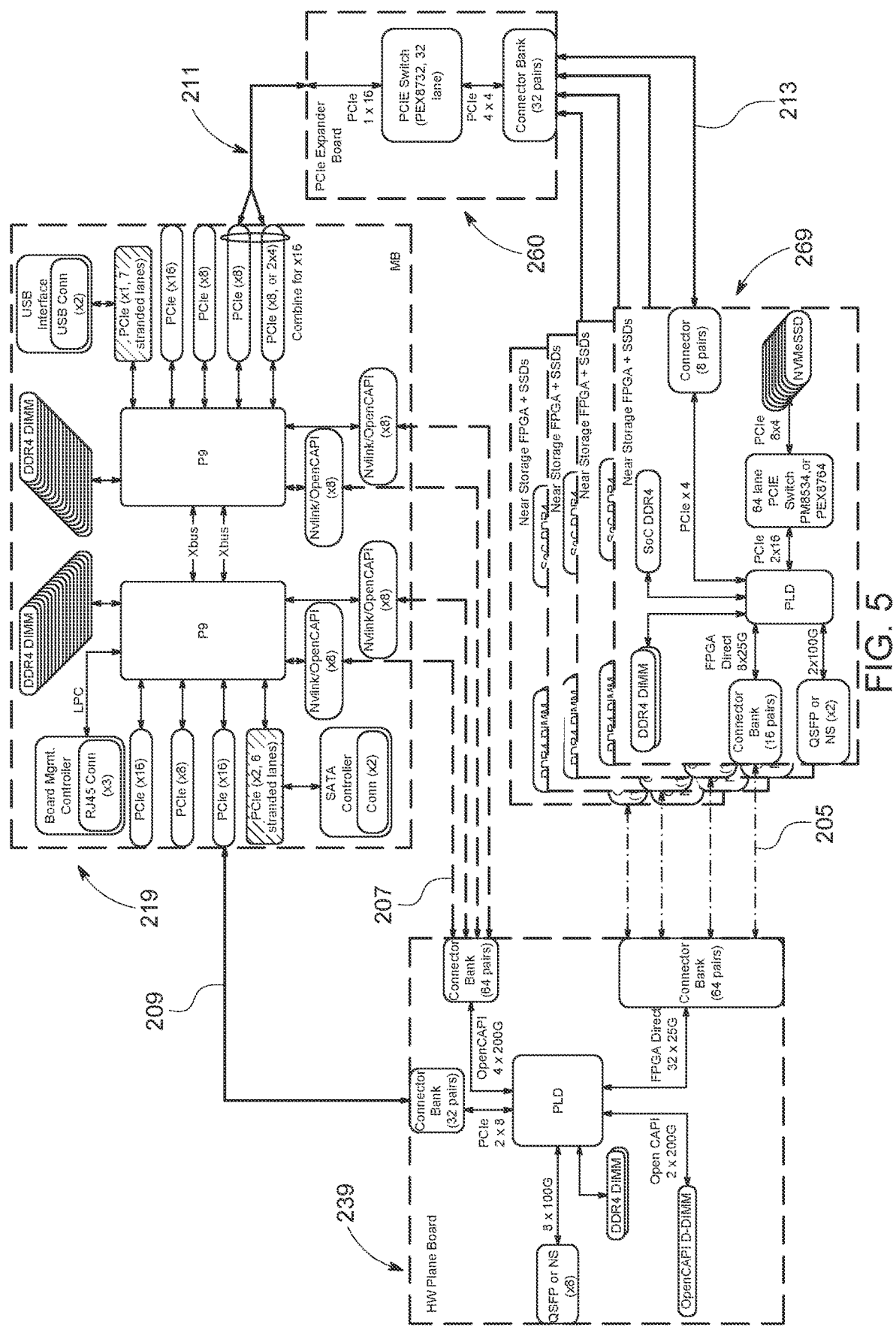
FIG. 5 is a schematic representation of another improved server configuration.
Figure 5A:
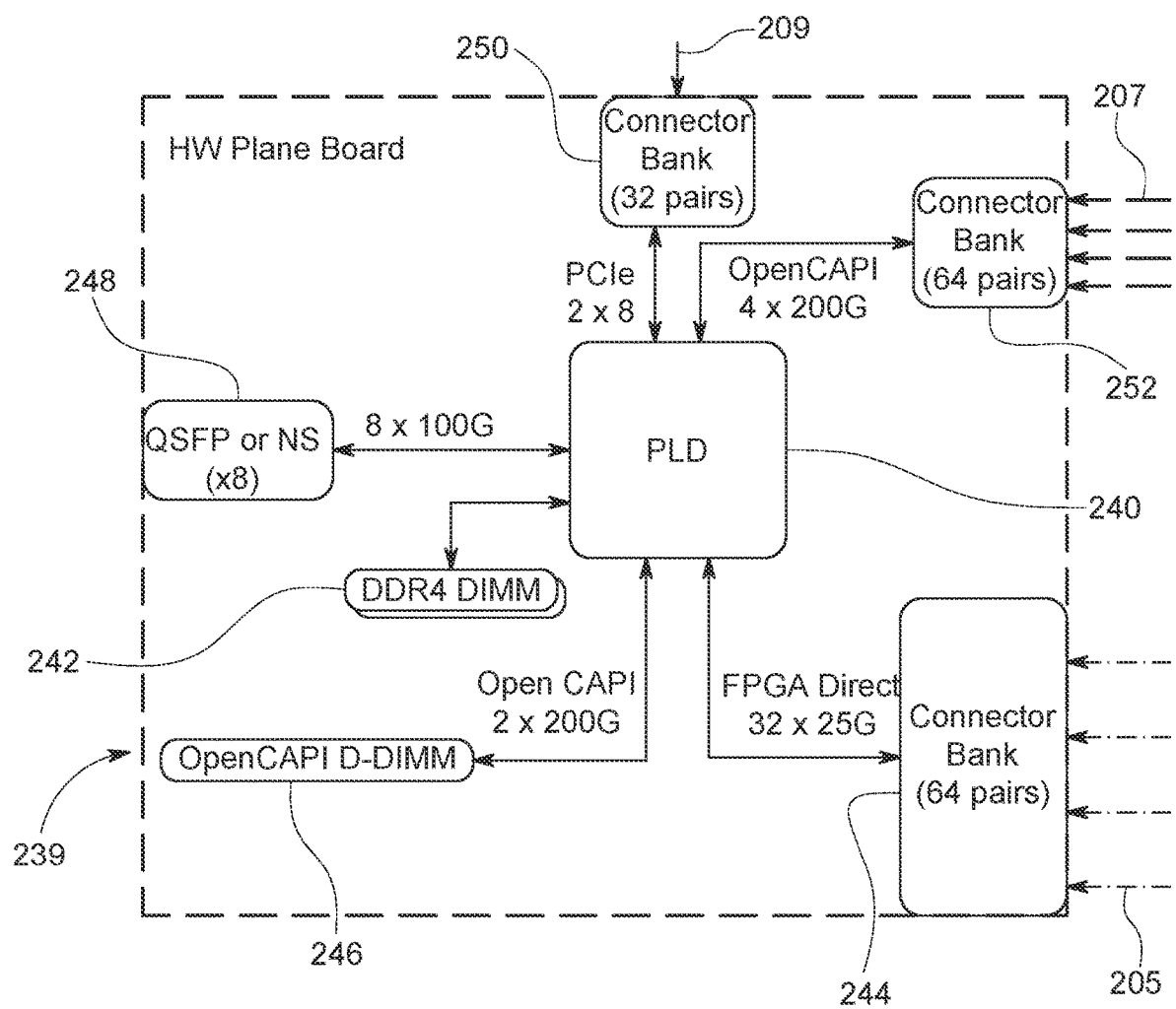
FIG. 5A is a schematic representation of the hardware plane module of the improved server configuration of FIG. 5.
Figure 5B:
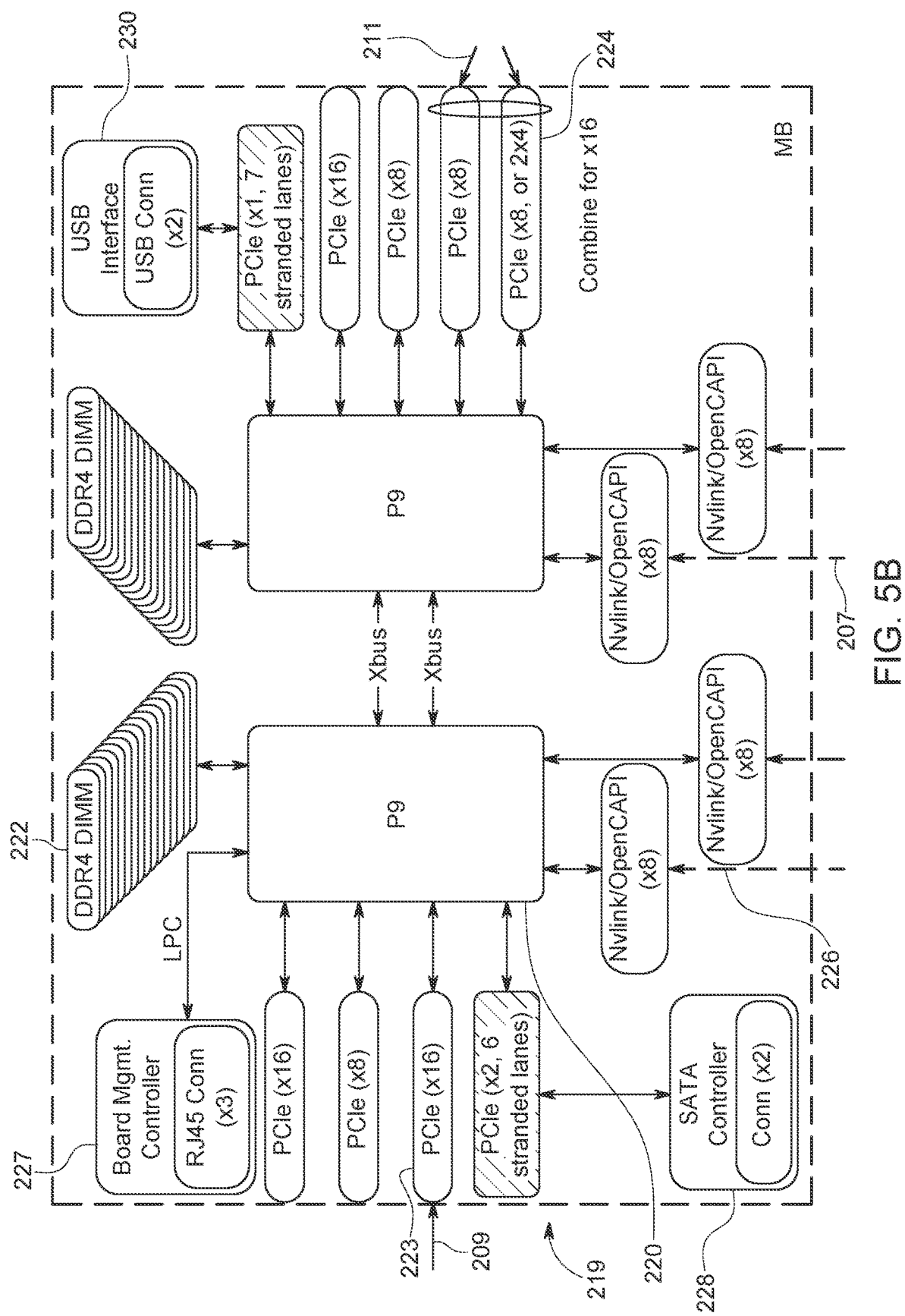
FIG. 5B is a schematic representation of a processor module of the improved server configuration of FIG. 5.
Figure 5C:
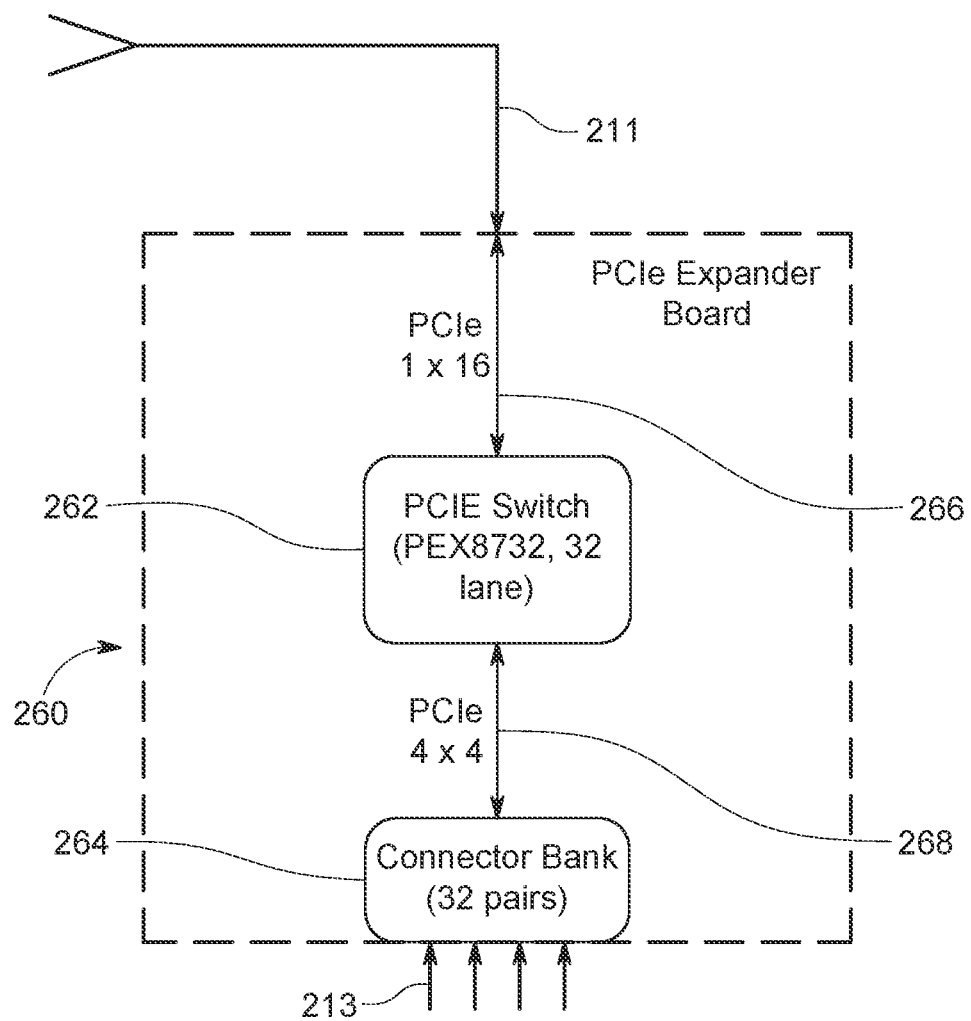
FIG. 5C is a schematic representation a PCIe expander module of the improved server configuration of FIG. 5.
Figure 5D:
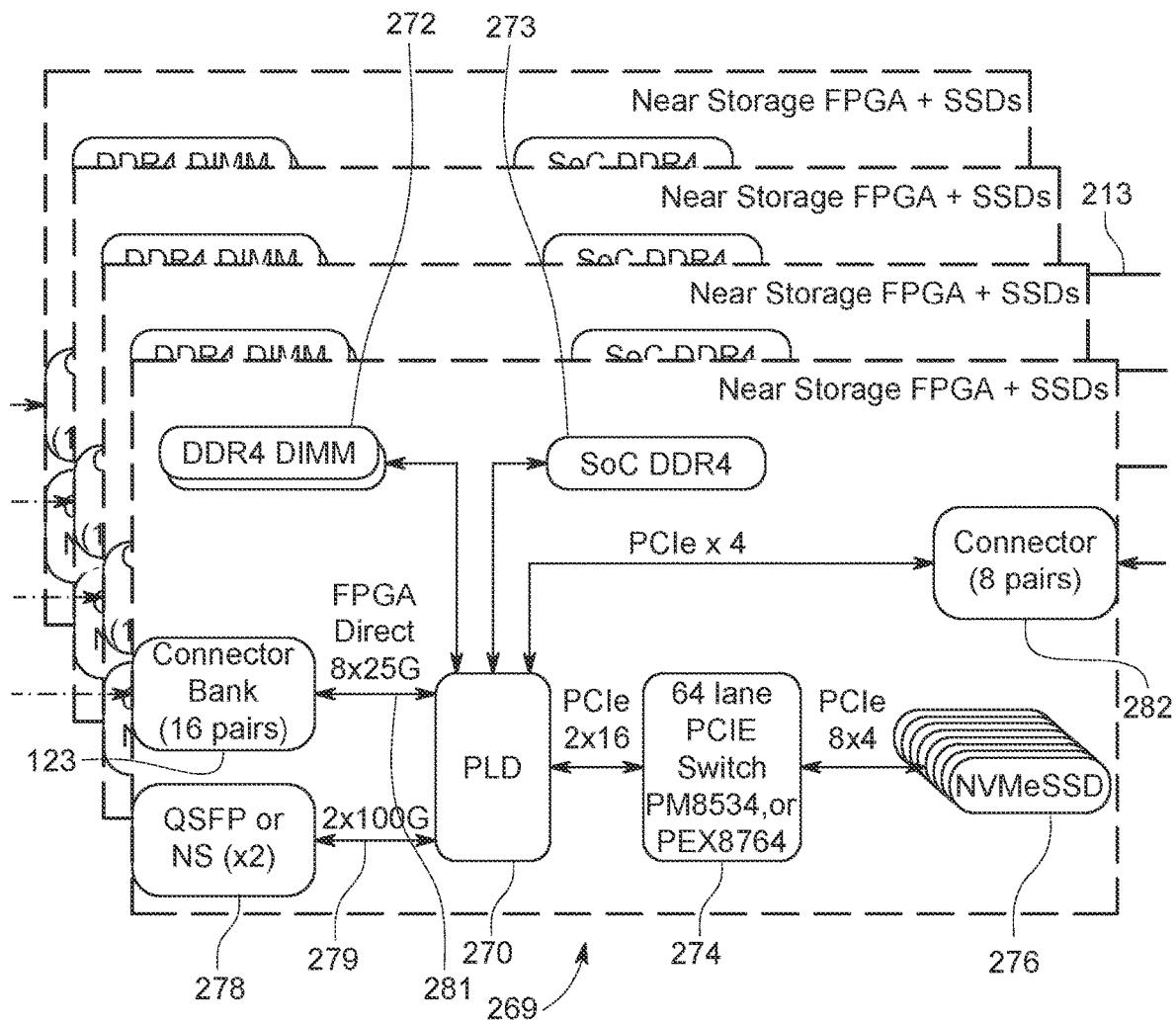
FIG. 5D is a schematic representation of a near-memory accelerator module of the improved server configuration of FIG. 5.

FIGS. 5-5D illustrate schematically represent another embodiment that is similar to the schematic depiction provided in FIG. 3. As can be appreciated, the features depicted in FIGS. 5B, 5C and 5D are similar to the features depicted in FIGS. 4-4C. More specifically, a processor module 219 depicted in FIG. 5B is similar to the processor module 139 depicted in FIG. 4B, a near-memory accelerator module 269 depicted in FIG. 5D is similar to the near-memory accelerator module 120 depicted in FIG. 4A, and a PCIe expander module 260 depicted in Fig. is similar to the PCIe expander module 159 depicted in FIG. 4C. The primarily difference between FIGS. 4-4C and FIGS. 5-5D is the inclusion of the hardware plane module 239.

The embodiment illustrated in FIGS. 5-5D provides 100 GB/s bandwidth between a processor array 220 and a hardware plane module 239. Similar bandwidth is provided between the hardware plane module 239 and the near-memory accelerator modules 269. As noted above, this bandwidth can be doubled by increase the data rate of each lane by 2. Naturally, such a change would also tend to increase the cost of the total system as channels that provide 50 Gbps instead of 25 Gbps are more challenging to design and generally require higher performing components.

As depicted, the processor module 219 includes the processor array 220 that is connected to main memory 222. The processor array 220 has PCIe channels 223, 224 that are respectively connected to links 209, 211. The processor array 220 is also connected to a SATA controller as well as channels 226 (which can be OpenCAPI channels) that are used to connect to a hardware plane module 239 via link 207. The processor module 219 can also include USB connectivity with USB interface module 230 and has a board management controller 227 that can be connected via RJ45 connectors to external devices.

The PCIe expander module 260 includes a PCIe switch 262 that includes a 1x16 PCIe channel 266 that is connected to link 211 (the connection could be via an edge card connector that the PCIe expander plugs into) and a 4x4 PCIe channel 268 that is connected to connectors 264, which are in turn connected to link 213.

The near-memory accelerator module 269 includes a PLD 270 that is connected to one or more DIMM modules 272 and an SoC DDR4 module 273. To connect to link 213, the PLD 270 is connected to a connector 282 and the connector 282 can support a PCIe 4x connection. The PLD is connected to a PCIe switch 274 that is in turn connected to the near-memory module 276 (which can be an array of SSDs). The PLD 270 is connected to connector 280 via lane 281. As depicted, there are 32 PCIe channels between the PCIe switch 274 and the PLD 270 and there are also 32 PCIe channels between the PCIe switch 274 and the near-memory module 276. If Gen 3 PCIe lanes are used then the collective bandwidth per near-memory accelerator module 269 is 256 Gbps or 32 GB/s. This is slightly greater than the bandwidth between the PLD 270 and a PLD 240 provided in hardware plane module 239 but in practice it has been found to be useful to have the link between the PLD 270 and the near-memory module 276 over provisioned so that throughput performance is maintained. The PLD 270 is communication with link 205 via connector 280 through connection 281 that as depicted is set up to provide 25 Gbps data rate for each differential pair (for a total of 200 Gbps or 25 GB/s of bandwidth). The depicted PLD is also configured to communicate through connection 279 to two connector 278 (which as noted, could be, without limitation, a QSFP or NearStack style connector). Naturally, if a connector with higher bandwidth (e.g., with more differential pairs) was used then a single connector could replace the two connectors 278 or the total bandwidth could be increased.

Of note, the near-memory accelerator modules depicted in FIGS. 4A and 5D both include includes ports for either internal or external communications. This allows the storage array to also function as communication between other switches or other servers in the rack. It should be noted that the type of interface for the connector, while stated as quad small form factor pluggable (QSFP) or NEWSTACK (NS), could be varied and could be replaced with any connector interface that meets bandwidth requirements. In addition, rather than provide 100 Gbps connectors, the bandwidth could be doubled by using 50 Gbps lanes (which could be provided by switching from 25 Gbps using NRV encoding to 50 Gbps using PAM 4 encoding on each lane) or by doubling the number of lanes and using a double quad small form factor pluggable (DQSFP) connector. Naturally this same change in the bandwidth for each lane can be applied to the OpenCAPI lanes as well, as noted above.

While the use of the near-memory accelerator module without the hardware plane helps provide some additional connectivity to an external device, the use of the hardware plane module 239 allows for substantially increased interconnectivity between processors in a server and processors and storage in other servers and also provides for increased connectivity to one or more switches. Such a construction allows for improved scalability as it become easier to connect the server to adjacent servers and the hardware plane module provides for a large amount of bandwidth (enough to support full access to each of the near-memory accelerator modules). Naturally, the number of connections between the various modules can be changed if desired. In addition, the number of connections between the hardware plane module and external components can also be changed. It may be desirable, however, to keep the bandwidth between the processor module and the near-memory accelerator module equal to the bandwidth between the near-memory accelerator module and an external point. The optional hardware plane module helps provide this functionality.

As depicted, the hardware plane module 239 includes a PLD 240 that has memory 242, which can be populated with convention RAM memory and also includes an OpenCAPI D-DIMM 246 (where D-DIMM could be a differential DIMM as is being finalized by the Joint Electron Device Engineering Council or JEDEC). The PLD 240 is connected to link 205 (which connects to the near-memory accelerator module), link 207 (which connects to the processor array via the OpenCAPI channels) and link 209 (which connects to the processor array 220 via PCIe channels). Connector 244 provides the physical connection to link 205 while connector 252 provides the physical connection to link 207 and connector 250 provides the physical connection to link 209. In each case, the connectors 244, 250 and 252 can be configured to accept one or more cable connectors to make the connection and thus could be one or a number of connectors. As can be appreciated, the PLD 240 redistributes the bandwidth from the processor array 220 to the plurality of near-memory accelerator modules 269.

The PLD 240 is also connected to a connector array 248 that can include a number of connectors that are suitable for communicating with external devices. While eight 100 Gbps connectors are shown, some other number could be provided. The connector array 248 can include, for example, eight QSFP connectors that are each configured for 100 Gbps performance. As can be appreciated, having eight 100 Gbps communication links to external devices provides 100 GB/s of bandwidth to external devices and allows for much more interconnectivity between adjacent servers and/or switches and substantially matches the bandwidth between the PLD 240 and the processor 220 or between the PLD 240 and the near-memory module 276.

In addition, the optional hardware plane module also allows the server to be reconfigured without significant software overhead. For example, the hardware plane module 239 can be connected to hardware plane modules in adjacent servers and this would allow a first server to provision available resources to a second server. In an embodiment, the first server would cease to perform activities on its own and it would suddenly look like it had zero resources and instead the processor array could be under the control of the second server. The second server would suddenly have double the resources and could more quickly complete a task that was suited to parallel processing. The improved server configuration thus allows for rapid handling of variable loads. The depicted server therefore allows for the creation of a secondary network that connects servers together for more rapid sharing of resources and potentially more efficient completion of tasks. This hardware configuration change can happen without rebooting the entire system.

Figure 1:
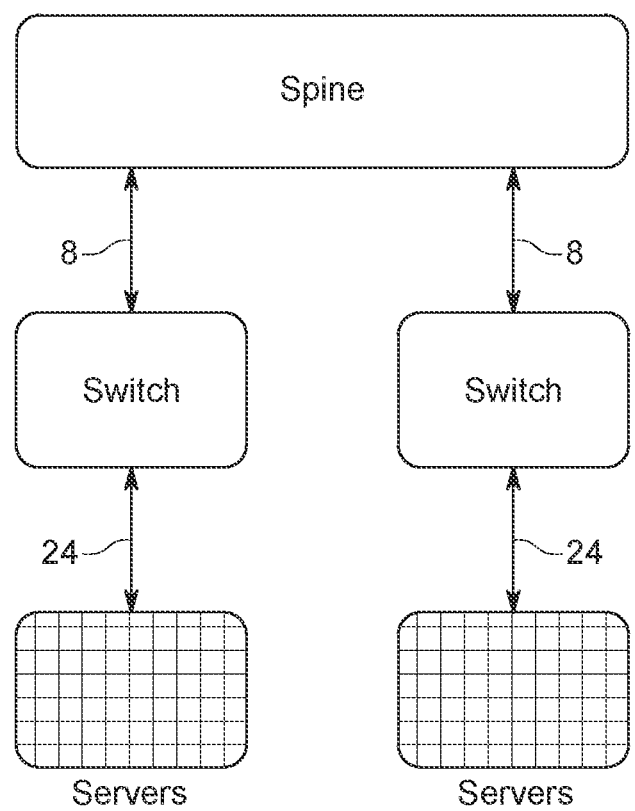
FIG. 1 is a schematic representation of a known datacenter configuration.

Returning to the standard configuration depicted in FIG. 1, the use of the hardware plane module 239 allows for interconnectivity between servers that are connected to the same switch as well as servers that are connected to two different switches. As can be appreciated, such connectivity allows the server system as a whole to be more flexible and capable to supporting varying workloads and is naturally well suited to working with a switch that has significant flexibility.

As noted above, cables can be used to connect to various modules. One embodiment could be a single card that has the hardware plane module (if included) and the plurality of near-memory accelerator modules positioned on the single card. In an alternative embodiment, a hardware plane module could be a first card and could be connected to the OpenCAPI channels via one or more cable assemblies. The plurality of near-memory accelerator modules could be provided on a plurality of second cards and the second cards could each be connected to the first card via one or more cable assemblies. As can be appreciated, therefore, the system can provide a high degree of flexibility. One further potential benefit is the ability of the PLD in the first and second cards to be reprogrammed. If, for example, the first card is intended to be used for OpenCAPI channels it would be programmed to work with the OpenCAPI protocol. The same first card could potentially also be plugged into a second system that operates with PCIe Gen 3 or 4 or 5 and as long as the PLD was reprogrammed it could function appropriately. Naturally the cable connection might need to be modified to accommodate a different connector configuration but the card itself would, once programmed appropriately, still function.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A reconfigurable server, comprising:
a processor module with a processor array, the processor array connected to main memory and having a plurality of PCIe channels and a plurality of high data rate capable channels;
a near-memory accelerator module connected to one of the high data rate capable channels, the near-memory accelerator module having a programmable logic device (PLD) that is an field programmable gate array (FPGA), wherein the PLD is connected to one of the high data rate capable channels and the PLD is connected to a PCIe switch with a predetermined number of PCIe lanes, the PCIe switch connected to a near-memory module with the predetermined number of PCIe lanes, wherein a bandwidth between the PLD and the near-memory module is within ten percent of a bandwidth between the PLD and the processor array.

2. The reconfigurable server of claim 1, wherein the bandwidth between the processor array and the PLD have a link that extends therebetween and the link supports a data rate of 25 Gigabytes per second (GB/s).

3. The reconfigurable server of claim 2, wherein the bandwidth between the PLD and the near-memory module is about 32 GB/s.

4. The reconfigurable server of claim 1, wherein there are a plurality of the near-memory accelerator modules, each one of the plurality of near-memory accelerator modules connected to one of the high data rate capable channels.

5. The reconfigurable server of claim 4, wherein the connection between the processor array and the near-memory modules provides 100 GB/s of bandwidth.

6. The reconfigurable server of claim 4, wherein the connection between the processor array and the near-memory modules provides 200 GB/s of bandwidth.

7. The reconfigurable server of claim 4, further comprising a PCIe expander module connected to a portion of the plurality of PCIe channels extending from the processor array, the PCIe expander module including a second PCIe switch that connects the portion of the plurality of PCIe channels from the processor array to PCIe channels extending between the second PCIe switch and the PLDs in the plurality of near-memory accelerator modules.

8. The reconfigurable server of claim 1, wherein the near-memory accelerator module further comprises a connector connected to the PLD, the connector configured to be connected to another server and supporting 100 Gbps data rate.

9. The reconfigurable server of claim 8, wherein the connector is a quad small form factor pluggable (QSFP) style connector.

10. A reconfigurable server, comprising:
a processor module with a processor array, the processor array connected to main memory and having a plurality of PCIe channels and a plurality of high data rate capable channels;
a hardware plane module with a first programmable logic device (PLD) that is a field programmable gate array (FPGA), the first PLD connected to the plurality of high data rate capable channels, and
a plurality of near-memory accelerator modules connected to the first PLD, each of the near-memory accelerator modules having a second PLD, wherein the second PLD is connected to the first PLD and each of the second PLDs is connected to a PCIe switch with a predetermined number of PCIe lanes, each of the PCIe switches being connected to a near-memory module with the predetermined number of PCIe lanes, wherein a bandwidth between the second PLD and the corresponding near-memory module is within ten percent of a bandwidth between the second PLD and the first PLD.

11. The reconfigurable server of claim 10, wherein the connection between the first PLD and the plurality of second PLDs provides 100 GB/s of bandwidth.

12. The reconfigurable server of claim 10, wherein the hardware plane module includes a connector array connected to the first PLD, the connector array including a plurality of connectors configured to be connected to external devices.

13. The reconfigurable server of claim 12, wherein the plurality of connectors provides a bandwidth of 100 GB/s to the external devices.

14. The reconfigurable server of claim 12, wherein each of the near-memory accelerator modules includes a connector configured to be connected to an external device.

15. The reconfigurable server of claim 12, further comprising a PCIe expander module connected to a portion of the plurality of PCIe channels extending from the processor array, the PCIe expander module including a second PCIe switch that connects the portion of the plurality of PCIe channels from the processor array to PCIe channels extending between the second PCIe switch and the second PLDs in the plurality of near-memory accelerator modules.

16. A server rack, comprising:
a switch; and
a plurality of servers connected to the switch, at least one of the servers being a reconfigurable server that includes:
  a processor module with a processor array, the processor array connected to main memory and having a plurality of PCIe channels and a plurality of high data rate capable channels;
  a hardware plane module with a first programmable logic device (PLD) that is a field programmable gate array (FPGA), the first PLD connected to the plurality of high data rate capable channels, wherein the hardware plane module includes a connector array connected to the first PLD, the connector array including a plurality of connectors configured to be connected to external devices, and
  a plurality of near-memory accelerator modules connected to the first PLD, each of the near-memory accelerator modules having a second PLD, wherein the second PLD is connected the first PLD and each of the second PLDs is connected to a PCIe switch with a predetermined number of PCIe lanes, each of the PCIe switches being connected to a near-memory module with the predetermined number of PCIe lanes, wherein a bandwidth between the second PLD and the corresponding near-memory module is within ten percent of a bandwidth between the second PLD and the first PLD;
  wherein at least one of the other plurality of servers is connected to the hardware plane module via one of the plurality of connectors.

17. The server rack of claim 16, wherein each of the servers is configured like the at least one server.

18. The server rack of claim 16, wherein the at least one server further includes a PCIe expander module connected to a portion of the plurality of PCIe channels extending from the processor array, the PCIe expander module including a second PCIe switch that connects the portion of the plurality of PCIe channels from the processor array to PCIe channels extending between the second PCIe switch and the second PLDs in the plurality of near-memory accelerator modules.

19. The server rack of claim 16, wherein the plurality of connectors collectively provide 100 GB/s of bandwidth.

* * * * *